United States Patent
Govari et al.

(10) Patent No.: US 12,533,489 B2
(45) Date of Patent: Jan. 27, 2026

(54) MEASURING TISSUE PROXIMITY FOR MULTI-ELECTRODE CATHETER

(71) Applicant: BIOSENSE WEBSTER (ISRAEL) LTD., Yokneam (IL)

(72) Inventors: Assaf Govari, Haifa (IL); Andres Claudio Altmann, Haifa (IL); Vadim Gliner, Haifa (IL); Alon Boumendil, Givat Nili (IL); Uri Avni, Ram-on (IL)

(73) Assignee: Biosense Webster (Israel) Ltd., Yokneam (IL)

( * ) Notice: Subject to any disclaimer, the term of this patent is extended or adjusted under 35 U.S.C. 154(b) by 512 days.

(21) Appl. No.: 17/496,976

(22) Filed: Oct. 8, 2021

(65) Prior Publication Data

US 2023/0112251 A1   Apr. 13, 2023

(51) Int. Cl.
| | |
|---|---|
| A61M 25/01 | (2006.01) |
| A61B 5/00 | (2006.01) |
| A61B 5/287 | (2021.01) |
| A61B 18/00 | (2006.01) |
| A61B 18/14 | (2006.01) |

(52) U.S. Cl.
CPC ......... *A61M 25/0105* (2013.01); *A61B 5/287* (2021.01); *A61B 5/6858* (2013.01); *A61B 18/1492* (2013.01); *A61B 2018/00267* (2013.01); *A61M 2025/0166* (2013.01); *A61M 2230/65* (2013.01)

(58) Field of Classification Search
CPC ...... A61M 25/0105; A61M 2025/0166; A61M 2230/65; A61B 5/287; A61B 5/6858; A61B 18/1492; A61B 2018/00267
See application file for complete search history.

(56) References Cited

U.S. PATENT DOCUMENTS

| | | | |
|---|---|---|---|
| 4,699,147 | A | 10/1987 | Chilson et al. |
| 4,940,064 | A | 7/1990 | Desai |
| 5,215,103 | A | 6/1993 | Desai |
| 5,255,679 | A | 10/1993 | Imran |
| 5,293,869 | A | 3/1994 | Edwards et al. |
| 5,309,910 | A | 5/1994 | Edwards et al. |
| 5,313,943 | A | 5/1994 | Houser et al. |
| 5,324,284 | A | 6/1994 | Imran |

(Continued)

FOREIGN PATENT DOCUMENTS

| | | |
|---|---|---|
| CN | 111248993 A | 6/2020 |
| CN | 111248996 A | 6/2020 |

(Continued)

*Primary Examiner* — Joel Lamprecht
*Assistant Examiner* — Amy Shaqat (57) ABSTRACT

A system includes a catheter and a processor. The catheter includes a distal-end assembly coupled to a distal end of a shaft for insertion into a cavity of an organ of a patient, the distal-end assembly including (i) one or more functional electrodes configured to be placed in contact with wall tissue of the cavity and (ii) a reference electrode configured to be placed in the cavity but not in contact with the wall tissue. The processor is configured to (i) estimate one or more impedances between one or more of the functional electrodes and the reference electrode, and (ii) based on the impedances, determine, for at least a functional electrode from among the one or more functional electrodes, whether the functional electrode is in physical contact with the wall tissue.

13 Claims, 3 Drawing Sheets

(56) References Cited

U.S. PATENT DOCUMENTS

| | | |
|---|---|---|
| 5,345,936 A | 9/1994 | Pomeranz et al. |
| 5,365,926 A | 11/1994 | Desai |
| 5,396,887 A | 3/1995 | Imran |
| 5,400,783 A | 3/1995 | Pomeranz et al. |
| 5,411,025 A | 5/1995 | Webster, Jr. |
| 5,415,166 A | 5/1995 | Imran |
| 5,456,254 A | 10/1995 | Pietroski et al. |
| 5,465,717 A | 11/1995 | Imran et al. |
| 5,476,495 A | 12/1995 | Kordis et al. |
| 5,499,981 A | 3/1996 | Kordis |
| 5,526,810 A | 6/1996 | Wang |
| 5,546,940 A | 8/1996 | Panescu et al. |
| 5,549,108 A | 8/1996 | Edwards et al. |
| 5,558,073 A | 9/1996 | Pomeranz et al. |
| 5,577,509 A | 11/1996 | Panescu et al. |
| 5,595,183 A | 1/1997 | Swanson et al. |
| 5,598,848 A | 2/1997 | Swanson et al. |
| 5,609,157 A | 3/1997 | Panescu et al. |
| 5,628,313 A | 5/1997 | Webster, Jr. |
| 5,681,280 A | 10/1997 | Rusk et al. |
| 5,722,401 A | 3/1998 | Pietroski et al. |
| 5,722,403 A | 3/1998 | McGee et al. |
| 5,725,525 A | 3/1998 | Kordis |
| 5,730,128 A | 3/1998 | Pomeranz et al. |
| 5,772,590 A | 6/1998 | Webster, Jr. |
| 5,782,899 A | 7/1998 | Imran |
| 5,823,189 A | 10/1998 | Kordis |
| 5,881,727 A | 3/1999 | Edwards |
| 5,893,847 A | 4/1999 | Kordis |
| 5,904,680 A | 5/1999 | Kordis et al. |
| 5,911,739 A | 6/1999 | Kordis et al. |
| 5,928,228 A | 7/1999 | Kordis et al. |
| 5,968,040 A | 10/1999 | Swanson et al. |
| 6,014,579 A | 1/2000 | Pomeranz et al. |
| 6,014,590 A | 1/2000 | Whayne et al. |
| 6,064,905 A | 5/2000 | Webster, Jr. et al. |
| 6,119,030 A | 9/2000 | Morency |
| 6,216,043 B1 | 4/2001 | Swanson et al. |
| 6,216,044 B1 | 4/2001 | Kordis |
| 6,428,537 B1 | 8/2002 | Swanson et al. |
| 6,456,864 B1 | 9/2002 | Swanson et al. |
| 6,574,492 B1 | 6/2003 | Ben-Haim et al. |
| 6,584,345 B2 | 6/2003 | Govari |
| 6,600,948 B2 | 7/2003 | Ben-Haim et al. |
| 6,738,655 B1 | 5/2004 | Sen et al. |
| 6,741,878 B2 | 5/2004 | Fuimaono et al. |
| 6,748,255 B2 | 6/2004 | Fuimaono et al. |
| 6,780,183 B2 | 8/2004 | Jimenez, Jr. et al. |
| 6,837,886 B2 | 1/2005 | Collins et al. |
| 6,866,662 B2 | 3/2005 | Fuimaono et al. |
| 6,892,091 B1 | 5/2005 | Ben-Haim et al. |
| 6,970,730 B2 | 11/2005 | Fuimaono et al. |
| 6,973,340 B2 | 12/2005 | Fuimaono et al. |
| 6,980,858 B2 | 12/2005 | Fuimaono et al. |
| 7,048,734 B1 | 5/2006 | Fleischman et al. |
| 7,149,563 B2 | 12/2006 | Fuimaono et al. |
| 7,255,695 B2 | 8/2007 | Falwell et al. |
| 7,257,434 B2 | 8/2007 | Fuimaono et al. |
| 7,399,299 B2 | 7/2008 | Daniel et al. |
| 7,410,486 B2 | 8/2008 | Fuimaono et al. |
| 7,522,950 B2 | 4/2009 | Fuimaono et al. |
| RE41,334 E | 5/2010 | Beatty et al. |
| 7,756,576 B2 | 7/2010 | Levin |
| 7,846,157 B2 | 12/2010 | Kozel |
| 7,848,787 B2 | 12/2010 | Osadchy |
| 7,869,865 B2 | 1/2011 | Govari et al. |
| 7,930,018 B2 | 4/2011 | Harlev et al. |
| 8,007,495 B2 | 8/2011 | McDaniel et al. |
| 8,048,063 B2 | 11/2011 | Aeby et al. |
| 8,103,327 B2 | 1/2012 | Harlev et al. |
| 8,167,845 B2 | 5/2012 | Wang et al. |
| 8,224,416 B2 | 7/2012 | De La Rama et al. |
| 8,235,988 B2 | 8/2012 | Davis et al. |
| 8,346,339 B2 | 1/2013 | Kordis et al. |
| 8,435,232 B2 | 5/2013 | Aeby et al. |
| 8,447,377 B2 | 5/2013 | Harlev et al. |
| 8,456,182 B2 | 6/2013 | Bar-Tal et al. |
| 8,498,686 B2 | 7/2013 | Grunewald |
| 8,517,999 B2 | 8/2013 | Pappone et al. |
| 8,545,490 B2 | 10/2013 | Mihajlovic et al. |
| 8,560,086 B2 | 10/2013 | Just et al. |
| 8,567,265 B2 | 10/2013 | Aeby et al. |
| 8,712,550 B2 | 4/2014 | Grunewald |
| 8,755,861 B2 | 6/2014 | Harlev et al. |
| 8,825,130 B2 | 9/2014 | Just et al. |
| 8,906,011 B2 | 12/2014 | Gelbart et al. |
| 8,945,120 B2 | 2/2015 | McDaniel et al. |
| 8,979,839 B2 | 3/2015 | De La Rama et al. |
| 9,037,264 B2 | 5/2015 | Just et al. |
| 9,131,980 B2 | 9/2015 | Bloom |
| 9,204,929 B2 | 12/2015 | Solis |
| 9,277,960 B2 | 3/2016 | Weinkam et al. |
| 9,314,208 B1 | 4/2016 | Altmann et al. |
| 9,339,331 B2 | 5/2016 | Tegg et al. |
| 9,486,282 B2 | 11/2016 | Solis |
| 9,554,718 B2 | 1/2017 | Bar-Tal et al. |
| D782,686 S | 3/2017 | Werneth et al. |
| 9,585,588 B2 | 3/2017 | Marecki et al. |
| 9,597,036 B2 | 3/2017 | Aeby et al. |
| 9,687,297 B2 | 6/2017 | Just et al. |
| 9,693,733 B2 | 7/2017 | Altmann et al. |
| 9,782,099 B2 | 10/2017 | Williams et al. |
| 9,788,895 B2 | 10/2017 | Solis |
| 9,801,681 B2 | 10/2017 | Laske et al. |
| 9,814,618 B2 | 11/2017 | Nguyen et al. |
| 9,833,161 B2 | 12/2017 | Govari |
| 9,894,756 B2 | 2/2018 | Weinkam et al. |
| 9,895,073 B2 | 2/2018 | Solis |
| 9,907,609 B2 | 3/2018 | Cao et al. |
| 9,974,460 B2 | 5/2018 | Wu et al. |
| 9,986,949 B2 | 6/2018 | Govari et al. |
| 9,993,160 B2 | 6/2018 | Salvestro et al. |
| 10,014,607 B1 | 7/2018 | Govari et al. |
| 10,028,376 B2 | 7/2018 | Weinkam et al. |
| 10,034,637 B2 | 7/2018 | Harlev et al. |
| 10,039,494 B2 | 8/2018 | Altmann et al. |
| 10,045,707 B2 | 8/2018 | Govari |
| 10,078,713 B2 | 9/2018 | Auerbach et al. |
| 10,111,623 B2 | 10/2018 | Jung et al. |
| 10,130,420 B2 | 11/2018 | Basu et al. |
| 10,136,828 B2 | 11/2018 | Houben et al. |
| 10,143,394 B2 | 12/2018 | Solis |
| 10,172,536 B2 | 1/2019 | Maskara et al. |
| 10,182,762 B2 | 1/2019 | Just et al. |
| 10,194,818 B2 | 2/2019 | Williams et al. |
| 10,201,311 B2 | 2/2019 | Chou et al. |
| 10,219,860 B2 | 3/2019 | Harlev et al. |
| 10,219,861 B2 | 3/2019 | Just et al. |
| 10,231,328 B2 | 3/2019 | Weinkam et al. |
| 10,238,309 B2 | 3/2019 | Bar-Tal et al. |
| 10,278,590 B2 | 5/2019 | Salvestro et al. |
| D851,774 S | 6/2019 | Werneth et al. |
| 10,314,505 B2 | 6/2019 | Williams et al. |
| 10,314,507 B2 | 6/2019 | Govari et al. |
| 10,314,648 B2 | 6/2019 | Ge et al. |
| 10,314,649 B2 | 6/2019 | Bakos et al. |
| 10,349,855 B2 | 7/2019 | Zeidan et al. |
| 10,350,003 B2 | 7/2019 | Weinkam et al. |
| 10,362,991 B2 | 7/2019 | Tran et al. |
| 10,375,827 B2 | 8/2019 | Weinkam et al. |
| 10,376,170 B2 | 8/2019 | Quinn et al. |
| 10,376,221 B2 | 8/2019 | Iyun et al. |
| 10,398,348 B2 | 9/2019 | Osadchy et al. |
| 10,403,053 B2 | 9/2019 | Katz et al. |
| 10,441,188 B2 | 10/2019 | Katz et al. |
| 10,470,682 B2 | 11/2019 | Deno et al. |
| 10,470,714 B2 | 11/2019 | Altmann et al. |
| 10,482,198 B2 | 11/2019 | Auerbach et al. |
| 10,492,857 B2 | 12/2019 | Guggenberger et al. |
| 10,542,620 B2 | 1/2020 | Weinkam et al. |
| 10,575,743 B2 | 3/2020 | Basu et al. |
| 10,575,745 B2 | 3/2020 | Solis |
| 10,582,871 B2 | 3/2020 | Williams et al. |
| 10,582,894 B2 | 3/2020 | Ben Zrihem et al. |

(56) References Cited

U.S. PATENT DOCUMENTS

| | | |
|---|---|---|
| 10,596,346 B2 | 3/2020 | Aeby et al. |
| 10,602,947 B2 | 3/2020 | Govari et al. |
| 10,617,867 B2 | 4/2020 | Viswanathan et al. |
| 10,660,702 B2 | 5/2020 | Viswanathan et al. |
| 10,667,753 B2 | 6/2020 | Werneth et al. |
| 10,674,929 B2 | 6/2020 | Houben et al. |
| 10,681,805 B2 | 6/2020 | Weinkam et al. |
| 10,682,181 B2 | 6/2020 | Cohen et al. |
| 10,687,892 B2 | 6/2020 | Long et al. |
| 10,702,178 B2 | 7/2020 | Dahlen et al. |
| 10,716,477 B2 | 7/2020 | Salvestro et al. |
| 10,758,304 B2 | 9/2020 | Aujla |
| 10,765,371 B2 | 9/2020 | Hayam et al. |
| 10,772,566 B2 | 9/2020 | Aujila |
| 10,799,281 B2 | 10/2020 | Goertzen et al. |
| 10,842,558 B2 | 11/2020 | Harlev et al. |
| 10,842,561 B2 | 11/2020 | Viswanathan et al. |
| 10,863,914 B2 | 12/2020 | Govari et al. |
| 10,881,376 B2 | 1/2021 | Shemesh et al. |
| 10,898,139 B2 | 1/2021 | Guta et al. |
| 10,905,329 B2 | 2/2021 | Bar-Tal et al. |
| 10,912,484 B2 | 2/2021 | Ziv-Ari et al. |
| 10,918,306 B2 | 2/2021 | Govari et al. |
| 10,939,871 B2 | 3/2021 | Altmann et al. |
| 10,952,795 B2 | 3/2021 | Cohen et al. |
| 10,973,426 B2 | 4/2021 | Williams et al. |
| 10,973,461 B2 | 4/2021 | Baram et al. |
| 10,987,045 B2 | 4/2021 | Basu et al. |
| 11,006,902 B1 | 5/2021 | Bonyak et al. |
| 11,040,208 B1 | 6/2021 | Govari et al. |
| 11,045,628 B2 | 6/2021 | Beeckler et al. |
| 11,051,877 B2 | 7/2021 | Sliwa et al. |
| 11,109,788 B2 | 9/2021 | Rottmann et al. |
| 11,116,435 B2 | 9/2021 | Urman et al. |
| 11,129,574 B2 | 9/2021 | Cohen et al. |
| 11,160,482 B2 | 11/2021 | Solis |
| 11,164,371 B2 | 11/2021 | Yellin et al. |
| 2004/0210121 A1 | 10/2004 | Fuimaono et al. |
| 2006/0009689 A1 | 1/2006 | Fuimaono et al. |
| 2006/0009690 A1 | 1/2006 | Fuimaono et al. |
| 2006/0100669 A1 | 5/2006 | Fuimaono et al. |
| 2007/0093806 A1 | 4/2007 | Desai et al. |
| 2007/0255162 A1 | 11/2007 | Abboud et al. |
| 2007/0276212 A1 | 11/2007 | Fuimaono et al. |
| 2008/0234564 A1 | 9/2008 | Beatty et al. |
| 2011/0118726 A1 | 5/2011 | De La Rama et al. |
| 2011/0160574 A1 | 6/2011 | Harlev et al. |
| 2011/0190625 A1 | 8/2011 | Harlev et al. |
| 2011/0245756 A1 | 10/2011 | Arora et al. |
| 2011/0301597 A1 | 12/2011 | McDaniel et al. |
| 2013/0172872 A1 | 7/2013 | Subramaniam et al. |
| 2013/0172883 A1 | 7/2013 | Lopes et al. |
| 2013/0178850 A1 | 7/2013 | Lopes et al. |
| 2013/0190587 A1 | 7/2013 | Lopes et al. |
| 2013/0296852 A1 | 11/2013 | Madjarov et al. |
| 2014/0025069 A1 | 1/2014 | Willard et al. |
| 2014/0052118 A1 | 2/2014 | Laske et al. |
| 2014/0180147 A1 | 6/2014 | Thakur et al. |
| 2014/0180151 A1 | 6/2014 | Maskara et al. |
| 2014/0180152 A1 | 6/2014 | Maskara et al. |
| 2014/0257069 A1 | 9/2014 | Eliason et al. |
| 2014/0276712 A1 | 9/2014 | Mallin et al. |
| 2014/0309512 A1 | 10/2014 | Govari et al. |
| 2015/0011991 A1 | 1/2015 | Buysman et al. |
| 2015/0045863 A1 | 2/2015 | Litscher et al. |
| 2015/0080693 A1 | 3/2015 | Solis |
| 2015/0105770 A1 | 4/2015 | Amit |
| 2015/0119878 A1 | 4/2015 | Heisel et al. |
| 2015/0133919 A1 | 5/2015 | McDaniel et al. |
| 2015/0208942 A1 | 7/2015 | Bar-Tal et al. |
| 2015/0250424 A1 | 9/2015 | Govari et al. |
| 2015/0270634 A1 | 9/2015 | Buesseler et al. |
| 2015/0342532 A1 | 12/2015 | Basu et al. |
| 2016/0081746 A1 | 3/2016 | Solis |
| 2016/0113582 A1 | 4/2016 | Altmann et al. |
| 2016/0113709 A1 | 4/2016 | Maor |
| 2016/0183877 A1 | 6/2016 | Williams et al. |
| 2016/0228023 A1 | 8/2016 | Govari |
| 2016/0228062 A1 | 8/2016 | Altmann et al. |
| 2016/0278853 A1 | 9/2016 | Ogle et al. |
| 2016/0302858 A1 | 10/2016 | Bencini |
| 2016/0338770 A1 | 11/2016 | Bar-Tal et al. |
| 2017/0027638 A1 | 2/2017 | Solis |
| 2017/0065227 A1 | 3/2017 | Marrs et al. |
| 2017/0071543 A1 | 3/2017 | Basu et al. |
| 2017/0071544 A1 | 3/2017 | Basu et al. |
| 2017/0071665 A1 | 3/2017 | Solis |
| 2017/0095173 A1 | 4/2017 | Bar-Tal et al. |
| 2017/0100187 A1 | 4/2017 | Basu et al. |
| 2017/0143227 A1 | 5/2017 | Marecki et al. |
| 2017/0156790 A1 | 6/2017 | Aujla |
| 2017/0172442 A1 | 6/2017 | Govari |
| 2017/0185702 A1 | 6/2017 | Auerbach et al. |
| 2017/0202515 A1 | 7/2017 | Zrihem et al. |
| 2017/0221262 A1 | 8/2017 | Laughner et al. |
| 2017/0224958 A1 | 8/2017 | Cummings et al. |
| 2017/0265812 A1 | 9/2017 | Williams et al. |
| 2017/0281031 A1 | 10/2017 | Houben et al. |
| 2017/0281268 A1 | 10/2017 | Tran et al. |
| 2017/0296084 A1* | 10/2017 | Blauer ................. A61B 5/6858 |
| 2017/0296125 A1 | 10/2017 | Altmann et al. |
| 2017/0296251 A1 | 10/2017 | Wu et al. |
| 2017/0347959 A1 | 12/2017 | Guta et al. |
| 2017/0354338 A1 | 12/2017 | Levin et al. |
| 2017/0354339 A1 | 12/2017 | Zeidan et al. |
| 2017/0354364 A1 | 12/2017 | Bar-Tal et al. |
| 2018/0008203 A1 | 1/2018 | Iyun et al. |
| 2018/0028084 A1 | 2/2018 | Williams et al. |
| 2018/0049803 A1 | 2/2018 | Solis |
| 2018/0078170 A1* | 3/2018 | Panescu .................. A61B 5/01 |
| 2018/0085064 A1 | 3/2018 | Auerbach et al. |
| 2018/0132749 A1 | 5/2018 | Govari et al. |
| 2018/0137687 A1 | 5/2018 | Katz et al. |
| 2018/0160936 A1 | 6/2018 | Govari et al. |
| 2018/0160978 A1 | 6/2018 | Cohen et al. |
| 2018/0168511 A1 | 6/2018 | Hall et al. |
| 2018/0184982 A1 | 7/2018 | Basu et al. |
| 2018/0192958 A1 | 7/2018 | Wu |
| 2018/0206792 A1 | 7/2018 | Auerbach et al. |
| 2018/0235692 A1 | 8/2018 | Efimov et al. |
| 2018/0249959 A1 | 9/2018 | Osypka |
| 2018/0256109 A1 | 9/2018 | Wu et al. |
| 2018/0279954 A1 | 10/2018 | Hayam et al. |
| 2018/0303414 A1 | 10/2018 | Toth et al. |
| 2018/0310987 A1 | 11/2018 | Altmann et al. |
| 2018/0311497 A1 | 11/2018 | Viswanathan et al. |
| 2018/0338722 A1 | 11/2018 | Altmann et al. |
| 2018/0344188 A1 | 12/2018 | Govari |
| 2018/0344202 A1 | 12/2018 | Bar-Tal et al. |
| 2018/0344251 A1 | 12/2018 | Harlev et al. |
| 2018/0344393 A1 | 12/2018 | Gruba et al. |
| 2018/0360534 A1 | 12/2018 | Teplitsky et al. |
| 2018/0365355 A1 | 12/2018 | Auerbach et al. |
| 2019/0000540 A1 | 1/2019 | Cohen et al. |
| 2019/0008582 A1 | 1/2019 | Govari et al. |
| 2019/0015007 A1 | 1/2019 | Rottmann et al. |
| 2019/0030328 A1 | 1/2019 | Stewart et al. |
| 2019/0053708 A1 | 2/2019 | Gliner |
| 2019/0059766 A1 | 2/2019 | Houben et al. |
| 2019/0069950 A1 | 3/2019 | Mswanathan et al. |
| 2019/0069954 A1 | 3/2019 | Cohen et al. |
| 2019/0117111 A1 | 4/2019 | Osadchy et al. |
| 2019/0117303 A1 | 4/2019 | Claude et al. |
| 2019/0117315 A1 | 4/2019 | Keyes et al. |
| 2019/0125439 A1 | 5/2019 | Rohl et al. |
| 2019/0133552 A1 | 5/2019 | Shemesh et al. |
| 2019/0142293 A1 | 5/2019 | Solis |
| 2019/0164633 A1 | 5/2019 | Ingel et al. |
| 2019/0167137 A1 | 6/2019 | Bar-Tal et al. |
| 2019/0167140 A1 | 6/2019 | Williams et al. |
| 2019/0183378 A1 | 6/2019 | Mosesov et al. |
| 2019/0188909 A1 | 6/2019 | Yellin et al. |
| 2019/0201664 A1 | 7/2019 | Govari |
| 2019/0209089 A1 | 7/2019 | Baram et al. |

(56) References Cited

U.S. PATENT DOCUMENTS

| | | |
|---|---|---|
| 2019/0216346 A1 | 7/2019 | Ghodrati et al. |
| 2019/0216347 A1 | 7/2019 | Ghodrati et al. |
| 2019/0231421 A1 | 8/2019 | Mswanathan et al. |
| 2019/0231423 A1 | 8/2019 | Weinkam et al. |
| 2019/0239811 A1 | 8/2019 | Just et al. |
| 2019/0246935 A1 | 8/2019 | Govari et al. |
| 2019/0274581 A1* | 9/2019 | Mosesov .............. A61B 5/6886 |
| 2019/0298442 A1 | 10/2019 | Ogata et al. |
| 2019/0314083 A1 | 10/2019 | Herrera et al. |
| 2019/0328260 A1 | 10/2019 | Zeidan et al. |
| 2019/0343580 A1 | 11/2019 | Nguyen et al. |
| 2020/0000518 A1 | 1/2020 | Kiernan et al. |
| 2020/0008705 A1 | 1/2020 | Ziv-Ari et al. |
| 2020/0008869 A1 | 1/2020 | Byrd |
| 2020/0009378 A1 | 1/2020 | Stewart et al. |
| 2020/0015890 A1 | 1/2020 | To et al. |
| 2020/0022653 A1 | 1/2020 | Moisa |
| 2020/0029845 A1 | 1/2020 | Baram et al. |
| 2020/0038101 A1 | 2/2020 | Tobey et al. |
| 2020/0046421 A1 | 2/2020 | Govari |
| 2020/0046423 A1 | 2/2020 | Mswanathan et al. |
| 2020/0060569 A1 | 2/2020 | Tegg |
| 2020/0077959 A1 | 3/2020 | Altmann et al. |
| 2020/0093539 A1 | 3/2020 | Long et al. |
| 2020/0129089 A1 | 4/2020 | Gliner et al. |
| 2020/0129125 A1 | 4/2020 | Govari et al. |
| 2020/0129128 A1 | 4/2020 | Gliner et al. |
| 2020/0179650 A1 | 6/2020 | Beeckler et al. |
| 2020/0196896 A1 | 6/2020 | Solis |
| 2020/0205689 A1 | 7/2020 | Squires et al. |
| 2020/0205690 A1 | 7/2020 | Williams et al. |
| 2020/0205737 A1 | 7/2020 | Beeckler |
| 2020/0205876 A1 | 7/2020 | Govari |
| 2020/0205892 A1 | 7/2020 | Viswanathan et al. |
| 2020/0206461 A1 | 7/2020 | Govari et al. |
| 2020/0206498 A1 | 7/2020 | Arora et al. |
| 2020/0289197 A1 | 9/2020 | Viswanathan et al. |
| 2020/0297234 A1 | 9/2020 | Houben et al. |
| 2020/0297281 A1 | 9/2020 | Basu et al. |
| 2020/0305726 A1 | 10/2020 | Salvestro et al. |
| 2020/0305946 A1 | 10/2020 | DeSimone et al. |
| 2020/0397328 A1 | 12/2020 | Altmann et al. |
| 2020/0398048 A1 | 12/2020 | Krimsky et al. |
| 2021/0015549 A1 | 1/2021 | Haghighi-Mood et al. |
| 2021/0022684 A1 | 1/2021 | Govari et al. |
| 2021/0045805 A1 | 2/2021 | Govari et al. |
| 2021/0059549 A1 | 3/2021 | Urman et al. |
| 2021/0059550 A1 | 3/2021 | Urman et al. |
| 2021/0059608 A1 | 3/2021 | Beeckler et al. |
| 2021/0059743 A1 | 3/2021 | Govari |
| 2021/0059747 A1 | 3/2021 | Krans et al. |
| 2021/0077184 A1 | 3/2021 | Basu et al. |
| 2021/0082157 A1 | 3/2021 | Rosenberg et al. |
| 2021/0085200 A1 | 3/2021 | Auerbach et al. |
| 2021/0085204 A1 | 3/2021 | Auerbach et al. |
| 2021/0085215 A1 | 3/2021 | Auerbach et al. |
| 2021/0085387 A1 | 3/2021 | Amit et al. |
| 2021/0093292 A1 | 4/2021 | Baram et al. |
| 2021/0093294 A1 | 4/2021 | Shemesh et al. |
| 2021/0093374 A1 | 4/2021 | Govari et al. |
| 2021/0093377 A1 | 4/2021 | Herrera et al. |
| 2021/0100612 A1 | 4/2021 | Baron et al. |
| 2021/0113822 A1 | 4/2021 | Beeckler et al. |
| 2021/0127999 A1 | 5/2021 | Govari et al. |
| 2021/0128010 A1 | 5/2021 | Govari et al. |
| 2021/0133516 A1 | 5/2021 | Govari et al. |
| 2021/0145282 A1 | 5/2021 | Bar-Tal et al. |
| 2021/0169421 A1 | 6/2021 | Govari |
| 2021/0169568 A1 | 6/2021 | Govari et al. |
| 2021/0177294 A1 | 6/2021 | Gliner et al. |
| 2021/0177356 A1 | 6/2021 | Gliner et al. |
| 2021/0178166 A1 | 6/2021 | Govari et al. |
| 2021/0186363 A1 | 6/2021 | Gliner et al. |
| 2021/0187241 A1 | 6/2021 | Govari et al. |
| 2021/0196372 A1 | 7/2021 | Altmann et al. |
| 2021/0196394 A1 | 7/2021 | Govari et al. |
| 2021/0212591 A1 | 7/2021 | Govari et al. |
| 2021/0219904 A1 | 7/2021 | Yarnitsky et al. |
| 2021/0278936 A1 | 9/2021 | Katz et al. |
| 2021/0282659 A1 | 9/2021 | Govari et al. |
| 2021/0307815 A1 | 10/2021 | Govari et al. |
| 2021/0308424 A1 | 10/2021 | Beeckler et al. |
| 2021/0338319 A1 | 11/2021 | Govari et al. |

FOREIGN PATENT DOCUMENTS

| | | |
|---|---|---|
| EP | 0668740 A1 | 8/1995 |
| EP | 0644738 B1 | 3/2000 |
| EP | 0727183 B1 | 11/2002 |
| EP | 0727184 B1 | 12/2002 |
| EP | 2783651 A1 | 10/2014 |
| EP | 2699151 B1 | 11/2015 |
| EP | 2699152 B1 | 11/2015 |
| EP | 2699153 B1 | 12/2015 |
| EP | 2498706 B1 | 4/2016 |
| EP | 2578173 B1 | 6/2017 |
| EP | 3238645 A1 | 11/2017 |
| EP | 2884931 B1 | 1/2018 |
| EP | 3473177 A1 | 4/2019 |
| EP | 2349440 B1 | 8/2019 |
| EP | 3318211 B1 | 12/2019 |
| EP | 3581135 A1 | 12/2019 |
| EP | 2736434 B1 | 2/2020 |
| EP | 3451962 B1 | 3/2020 |
| EP | 3972510 A1 | 3/2022 |
| WO | 9421167 A1 | 9/1994 |
| WO | 9421169 A1 | 9/1994 |
| WO | 9625095 A1 | 8/1996 |
| WO | 9634560 A1 | 11/1996 |
| WO | 0182814 B1 | 5/2002 |
| WO | 2004087249 A2 | 10/2004 |
| WO | 2012100185 A2 | 7/2012 |
| WO | 2013052852 A1 | 4/2013 |
| WO | 2013162884 A1 | 10/2013 |
| WO | 2013173917 A1 | 11/2013 |
| WO | 2013176881 A1 | 11/2013 |
| WO | 2014036439 A2 | 3/2014 |
| WO | 2014176205 A1 | 10/2014 |
| WO | 2016019760 A1 | 2/2016 |
| WO | 2016044687 A1 | 3/2016 |
| WO | 2016134264 A1 | 8/2016 |
| WO | 2018111600 A1 | 6/2018 |
| WO | 2018191149 A1 | 10/2018 |
| WO | 2019084442 A1 | 5/2019 |
| WO | 2019143960 A1 | 7/2019 |
| WO | 2020026217 A1 | 2/2020 |
| WO | 2020206328 A1 | 10/2020 |

* cited by examiner

MEASURING TISSUE PROXIMITY FOR MULTI-ELECTRODE CATHETER

FIELD OF THE INVENTION

The present invention relates generally to medical probes, and particularly to multi-electrode catheters.

BACKGROUND OF THE INVENTION

Various techniques for verifying contact of an electrode of a catheter with cardiac tissue have been proposed in the patent literature. For example, U.S. Patent Application Publication 2007/0255162 describes methods and systems for providing tissue contact assessment by providing a catheter having a shaft having a plurality of electrodes, positioning the catheter at a tissue treatment site, applying an electrical current between at least two of the plurality of electrodes, measuring impedance voltage between the at least two of the plurality of electrodes and, processing the measured impedance voltage caused by the applied electrical current to provide contact assessment.

As another example, U.S. Patent Application Publication 2020/0038101 describes an apparatus including a shaft and an end effector at a distal end of the shaft. The end effector has a distal end and a proximal end with a longitudinal intermediate point between the distal and proximal ends. The end effector is sized to fit in an anatomical passageway within a cardiovascular system. The end effector includes at least one sensor electrode and a reference electrode. The at least one sensor electrode is configured to contact cardiovascular tissue and thereby pick up potentials. The reference electrode is configured to pick up a potential from fluid in contact with the reference electrode. The reference electrode is located proximal to the longitudinal intermediate point of the end effector. The end effector is configured to prevent the reference electrode from contacting tissue.

An electrophysiological use of an electrode disposed in an interior of a basket catheter was previously reported. For example, U.S. Pat. No. 10,045,707 describes cardiac catheterization performed with a catheter having a basket-shaped assembly at its distal end. A plurality of spline electrodes is disposed on the splines of the assembly. A far-field electrode is disposed in the interior of the assembly. An intracardiac electrogram and a far-field electrogram are obtained with at least one of the spline electrodes and the far-field electrode, respectively. The far-field component is removed from the intracardiac electrogram using the far-field electrogram.

SUMMARY OF THE INVENTION

An embodiment of the present invention provides a system including a catheter and a processor. The catheter includes a distal-end assembly coupled to a distal end of a shaft for insertion into a cavity of an organ of a patient, the distal-end assembly including (i) one or more functional electrodes configured to be placed in contact with wall tissue of the cavity and (ii) a reference electrode configured to be placed in the cavity but not in contact with the wall tissue. The processor is configured to (i) estimate one or more impedances between one or more of the functional electrodes and the reference electrode, and (ii) based on the impedances, determine, for at least a functional electrode from among the one or more functional electrodes, whether the functional electrode is in physical contact with the wall tissue.

In some embodiments, the processor is configured to determine that the functional electrode is in physical contact with the wall tissue by determining that a measured impedance is lower than a prespecified impedance threshold.

In some embodiments, the prespecified impedance is measured while the reference electrode is in contact with blood in the cavity.

In an embodiment, the processor is further configured to estimate, based on the impedances, for at least a functional electrode from among the one or more functional electrodes, a distance between the functional electrode and the wall tissue.

In another embodiment, the processor is configured to estimate the distance using calibrated proximity data that translates between impedance and electrode-tissue distance.

In some embodiments, the catheter is a basket catheter having an expandable frame including multiple splines, wherein the functional electrodes are coupled to the splines, and wherein the reference electrode is located in an interior of the expandable frame.

In some embodiments, the system further includes a relay assembly that is configured to switch, under control of the processor, between (i) a first configuration for measuring impedances between the functional electrodes and the reference electrode, and (ii) a second configuration for performing a medical procedure using the functional electrodes.

There is additionally provided, in accordance with an embodiment of the present invention, a method including inserting into a cavity of an organ of a patient a catheter including a distal-end assembly coupled to a distal end of a shaft, the distal-end assembly including (i) one or more functional electrodes configured to be placed in contact with wall tissue of the cavity and (ii) a reference electrode configured to be placed in the cavity but not in contact with the wall tissue. One or more impedances are estimated, between one or more of the functional electrodes and the reference electrode. Based on the impedances, a determination is made, for at least a functional electrode from among the one or more functional electrodes, whether the functional electrode is in physical contact with the wall tissue.

The present invention will be more fully understood from the following detailed description of the embodiments thereof, taken together with the drawings in which:

DETAILED DESCRIPTION OF EMBODIMENTS

Overview

A multi-electrode cardiac catheter typically comprises a distal-end assembly onto which multiple electrodes are disposed. For example, a basket catheter typically comprises an expandable frame of splines as a type of a distal-end assembly, that is coupled to the distal end of a shaft for insertion into a cavity of an organ of a patient. As another example, a catheter with multi-arm distal end assembly has multiple arms that open, which carry the electrodes. Alternatively, a multi-electrode catheter may be made from a distal end configured to capture a preformed shape, such as an arcuate shape of a lasso.

For the best outcome of electrophysiological (EP) diagnostic and/or ablation treatment, a physician may need to determine that each of the multiple electrodes disposed over the spines/arms/preformed-shape-distal-end (these electrodes called hereinafter "functional electrodes") is in physical contact with cavity wall tissue to be diagnosed and/or ablated. For example, when a basket catheter with multiple functional electrodes is used to measure arrhythmia over and/or ablate an ostium of a pulmonary ventricle (PV), typically all of a sub-set of functional electrodes distributed over an entire lateral circumference of the catheter should be positioned so they are in full contact with the PV tissue.

It is not uncommon, however, for some of these functional electrodes to be immersed in blood rather than in contact with tissue. A tissue area under such an electrode will not be characterized correctly, or, in the case of ablation, the applied electrical power in these electrodes may cause unwanted side effects, such as clot formation.

Embodiments of the present invention that are described herein provide a system and methods capable of determining whether a functional electrode is in contact with tissue. The embodiments provide distal-end assemblies comprising (i) at least one functional electrode and (ii) a reference electrode disposed on the assembly or on a distal end of the shaft, such that it does not make contact with tissue. This reference electrode is also called hereinafter "interior electrode" or "center electrode."

In some embodiments, a distal-end assembly of a basket catheter comprises an expandable frame having one or more functional electrodes disposed thereon, and a reference electrode disposed on a backbone of the frame (e.g., on a contraction wire) that is in a volume defined by the frame of the catheter. This backbone-disposed electrode is called hereinafter "interior electrode" or "center electrode."

Using impedance measurements between each functional electrode and the reference electrode, a processor of the EP-mapping/ablation system determines, for each functional electrode, whether or not it is in contact with wall tissue.

In some embodiments, the processor of the system compares impedances measured inside the heart between a functional electrode, which is intended to have contact with cardiac wall tissue of a cardiac chamber, and the interior electrode. When the functional electrode makes tissue contact, the impedances measured are smaller than the impedances measured with the functional electrode in blood by at least a prespecified minimal value. Depending on, for example, the number of electrodes already in full contact with tissue, different minimal values of impedance difference may be prespecified. The prespecified minimal values can be stored, for example, in a look-up table.

The above-mentioned prespecified minimal impedance-difference values are typically determined at an RF frequency of a several tens of kHz, at which cardiac tissue impedance is typically similar or lower than that of blood (both in the range of few 100Ω or less). Further information on tissue vs blood impedances as a function of RF frequencies is available, for example, in "Medical Instrumentation: Application and Design," Webster (ed.) $3^{rd}$ Ed., John Wiley & Sons, Inc., New York, 1998.

The disclosed measurement geometry involves comparable path lengths in blood and tissue, so the measured impedances mainly change due to sufficient tissue impedance in parallel to blood impedance. This characteristic of the disclosed technique gives a high degree of certainty to the distinction made by the processor based on the measurements between blood contact and tissue contact.

As a functional electrode approaches a wall tissue, the measured impedance approaches that of an electrode in firm contact with tissue. The sufficient change experienced in impedance between blood and tissue contact, and a sufficient accuracy of measurement, allow, in some embodiments, a proximity estimate of such a functional electrode to wall tissue. Such a measurement gives the change (e.g., drop) due to a relative contribution of tissue impedance to total impedance, which is a continuous function of a distance in blood between the functional electrode and wall tissue.

If physical contact is not achieved for all required functional electrodes, the physician may maneuver the basket catheter to establish more complete contact of the functional electrodes with tissue over the entire lateral perimeter of the basket catheter, and again check the sufficiency and/or existence of contact using the disclosed technique.

In some embodiments, in order to measure a basket catheter position inside the organ, the disclosed system includes a position tracking sub-system that measures impedances between the functional electrodes and surface electrodes. The method, which is further described below, is sometimes called Advanced Catheter Location (ACL). Using a relay assembly, the system can switch electrical connections between the functional electrodes and surface electrodes and between the functional electrodes the interior electrode of the basket catheter in order to interchangeably measure electrode position and degree of functional electrode contact with tissue at the location.

Furthermore, using the relay assembly, the system can switch electrical connections between the functional electrodes and either the reference electrode (for assessing contact) or the surface electrodes (for measuring positions) to a back patch electrode in order to perform unipolar ablation by driving radiofrequency (RF) signals between the functional electrodes and the back patch electrode.

More generally, using the relay assembly, the system can switch electrical connections, under control of the processor, between (i) a first configuration for measuring impedances between the functional electrodes and the reference electrode, and (ii) a second configuration for performing ablation by driving an ablation signal to the functional electrodes.

Typically, the processor is programmed in software containing a particular algorithm that enables the processor to conduct each of the processor-related steps and functions outlined hereinafter.

By determining, in real time, which functional electrode is in contact with tissue and which is not, the disclosed technique may increase the safety and effectiveness of catheterization procedures using multi-electrode basket catheters.

The above technique holds for various types of multi-electrode catheters, such as balloon, multi-arm and lasso catheters, wherever such include at least one reference-electrode that is immersed in blood pool and cannot contact tissue, such as an electrode disposed on a distal end of a shaft just proximally to the expandable frame of the multi-electrode catheter.

System Description

Figure 1:
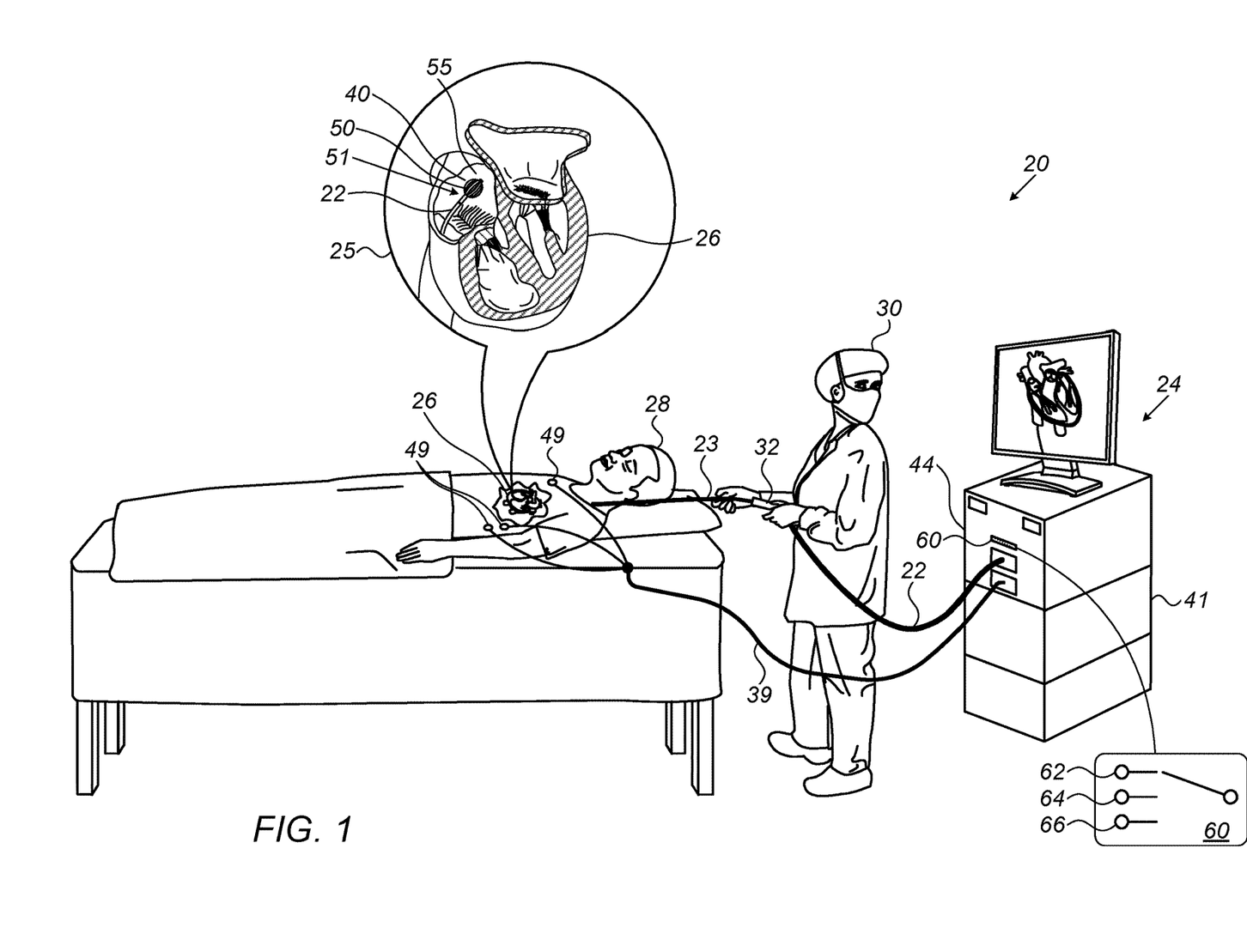
FIG. 1 is a schematic pictorial illustration of a catheter-based electrophysiological (EP) mapping, position-tracking and ablation system comprising a basket catheter, in accordance with an embodiment of the present invention.

FIG. 1 is a schematic pictorial illustration of a catheter-based electrophysiological (EP) mapping, position-tracking and ablation system 20 comprising a basket catheter 40, in accordance with an embodiment of the present invention. Specifically, basket catheter 40 is used for EP diagnostics and/or therapeutic treatment, such as for identifying and ablating arrhythmogenic cardiac tissue, for example at the left atrium. System 20 is used to determine the position of basket catheter 40, seen in an inset 25 coupled to a distal end of a shaft 22. System 20 is further used to determine, e.g., prior to performing diagnostics and/or ablation, whether each of functional electrodes 50 of basket catheter 40 is in contact with tissue, or immersed in blood pool 55.

Physician 30 navigates basket catheter 40 to a target location in a heart 26 of a patient 28 by manipulating shaft 22 using a manipulator 32 near the proximal end of the catheter and/or deflection from a sheath 23. Basket catheter 40 is inserted, in a collapsed configuration, through sheath 23, and only after the basket is retracted from sheath 23 does basket catheter 40 expand to regain its intended functional shape. By containing basket catheter 40 in a folded configuration, sheath 23 also serves to minimize vascular trauma on its way to the target location.

Basket catheter 40 comprises multiple functional electrodes 50, which are disposed on an outer surface of the basket splines. An interior, i.e., center, electrode 51 is disposed on a contraction wire (seen in FIG. 2) inside the expandable frame of the basket. Interior electrode 51 is used to determine whether each of functional electrodes 50 is in contact with tissue or immersed in blood pool 55.

Figure 2:
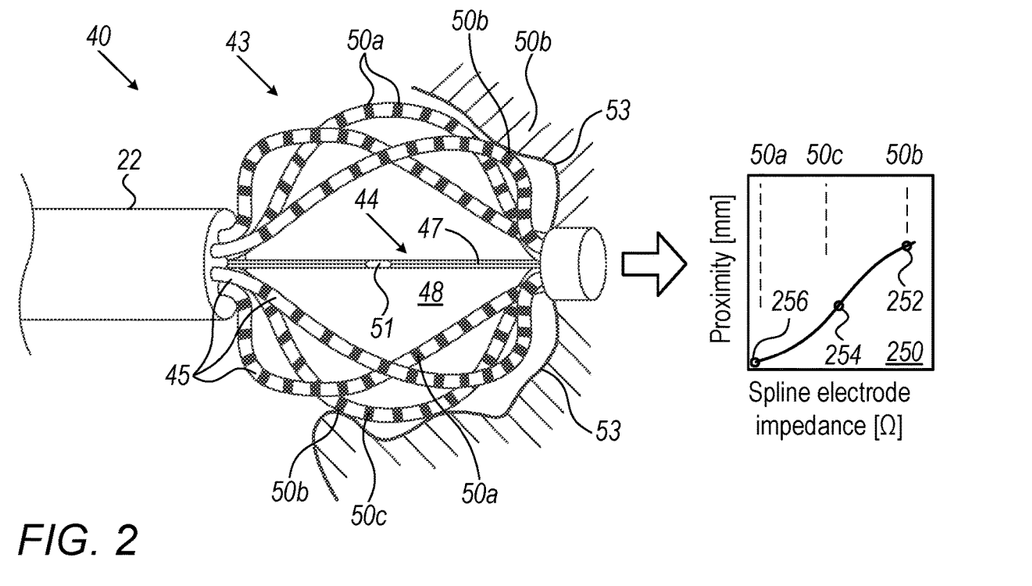
FIG. 2 is a perspective, schematic view of the basket catheter of FIG. 1 in physical contact with cavity wall tissue, in accordance with an embodiment of the present invention.

Functional electrodes 50 and interior electrode 51 are connected by wires running through shaft 22 to interface circuits 44 in a console 24. A detailed view of basket catheter 40 with functional electrodes 50 and interior electrode 51 is shown in FIG. 2.

Additionally, using the aforementioned ACL method, functional electrodes 50 can be used to measure a position of basket catheter 40 inside heart 26 by sensing impedances relative to surface electrodes 49, which are seen in the exemplified system as attached by wires running through a cable 39 to the chest of patient 28. The ACL method for tracking the positions of electrodes 50 is implemented in various medical applications, for example in the CARTO™ system, produced by Biosense-Webster Inc. (Irvine, California) and is described in detail in U.S. Pat. Nos. 7,756,576, 7,869,865, 7,848,787, and 8,456,182, whose disclosures are all incorporated herein by reference. Console 24 drives a display 27, which shows the tracked position of basket catheter 40 inside heart 26.

Console 24 comprises a processor 41, typically a general-purpose computer and a suitable front end and interface circuits 44 for transmitting and receiving signals, such as RF signals and position signals, respectively. Interface circuits 44 may also receive electrocardiograms from surface electrodes 49 and/or from any electrode disposed on the catheter.

In some embodiments, processor 41 controls a relay assembly 60 in system 20 to switch electrical connections between two or more of (i) a first configuration having a connection (62) between the functional electrodes and surface electrodes 49 for measuring impedances between the functional electrodes and one or more body-surface electrodes, (ii) a second configuration having a connection (64) between the functional electrodes and the interior electrode of the basket catheter for measuring impedances between the functional electrodes and the interior electrode, where connections 62 and 64 are used in order to interchangeably measure electrode position and degree of functional electrode contact with tissue at the location, and (iii) a connection (66) between the functional electrodes and a back patch electrode (not shown) in order to perform ablation by driving an RF signal between the functional electrodes and the back patch electrode.

Processor 41 is typically programmed in software to carry out the functions described herein. The software may be downloaded to the computer in electronic form, over a network, for example, or it may, alternatively or additionally, be provided and/or stored on non-transitory tangible media, such as magnetic, optical, or electronic memory. In particular, processor 41 runs a dedicated algorithm as disclosed herein, including in FIG. 4, that enables processor 41 to perform the disclosed steps, as further described below.

FIG. 1 shows only elements related to the disclosed techniques for the sake of simplicity and clarity. System 20 typically comprises additional modules and elements that are not directly related to the disclosed techniques, such as irrigation and temperature modules, and thus are intentionally omitted from FIG. 1 and from the corresponding description.

Measuring Tissue Proximity for Basket Catheter

FIG. 2 is a perspective, schematic view of basket catheter 40 of FIG. 1 in physical contact with cavity wall tissue, in accordance with an embodiment of the present invention.

The shown portion of catheter 40 comprises a distal end of shaft 22 and a basket-shaped electrode assembly 43 mounted at the distal end. Shaft 22 comprises an elongated tubular construction having a single, axial or center lumen (not shown). The thickness of the outer wall of shaft 22 is not critical, but is preferably thin enough so that the central lumen can accommodate a puller wire, lead wires, sensor cables, as well as other wires, cables or tubes. An example of a catheter body construction suitable for use in connection with the present invention is described and depicted in U.S. Pat. No. 6,064,905, the entire disclosure of which is incorporated herein by reference.

As shown in FIG. 2, basket-shaped electrode assembly 43 comprises six splines 45 mounted evenly spaced around a backbone 44 comprising contraction wire 47, which is connected to the distal extremity of the electrode assembly 43, and which contracts, retracts and expands the electrode assembly 43 when a tractive or a pushing force is applied longitudinally to contraction wire 47, as the case may be. As seen, the backbone 44 comprising the contraction wire 47 forms a longitudinal axis 62 of symmetry for the electrode assembly 43. Splines 45 are all attached, directly or indirectly, to the contraction wire 47 at their distal ends, and to shaft 22 at their proximal ends. Splines 45 define an inner volume 48 in which center electrode is located and prevented, by the splines, from being near tissue. When the contraction wire 47 is moved longitudinally to expand and contract the electrode assembly 43, the expanded position of the splines 45 are bowed outwardly, and in the contracted position the splines 45 are generally straight. As will be recognized by one skilled in the art, the number of splines 45 can vary as desired, depending on the particular application, so that the electrode assembly 43 preferably has at least three splines and as many as eight splines or more. As used herein, the term "basket shaped" in describing the electrode assembly 43 is not limited to the depicted configuration, but can include other designs, such as spherical or egg-shaped designs that include a plurality of expandable arms connected, directly or indirectly, at their proximal and distal ends.

Each of the functional electrodes 50 on splines 45 is electrically connected to system 20, to an appropriate mapping or monitoring subsystem and/or source of ablation energy by means of an electrode lead wire (not shown). The contraction wire 47 is provided with a center electrode 51, e.g., a cylindrical electrode, the function of which is further described below.

Each of the splines 45 comprise a flexible wire with a non-conductive covering on which one or more ring functional electrodes 50 are mounted. Functional electrodes 50, immersed deep in blood, are denoted 50*a*, whereas functional electrodes 50 in physical contact with wall tissue 53 (e.g., with endocardial surface 53 of heart 26) are denoted 50*b*. Electrodes that are in various levels of proximity to wall tissue 53 are denoted 50*c*. The term "sufficient" can be understood by a graph 250, that shows that an impedance 254 of such electrodes (50*c*) can be measured to be between an impedance 252 of an electrode 50*a* and impedance 256 of an electrode 50*b*. After calibrating graph 250, a processor can estimate, from impedance 254, a proximity of a functional electrode 50 to tissue, e.g., in millimeters. Graph 250 can be saved in a memory of system 20 as a calibrated proximity look-up table. More generally, the processor uses calibrated proximity data that translates between impedance and electrode-tissue distance.

Estimating Proximity and/or Contact with Tissue

Figure 3A:
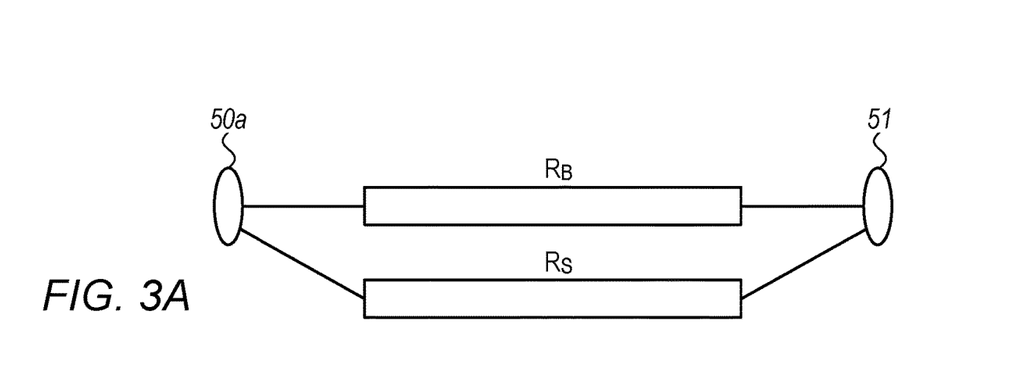
FIGS. 3A and 3B are schematic electrical diagrams of a functional electrode electrically coupled to an interior electrode while the functional electrode is in a blood pool and in contact with wall tissue, respectively, in accordance with an embodiment of the present invention.
Figure 3B:
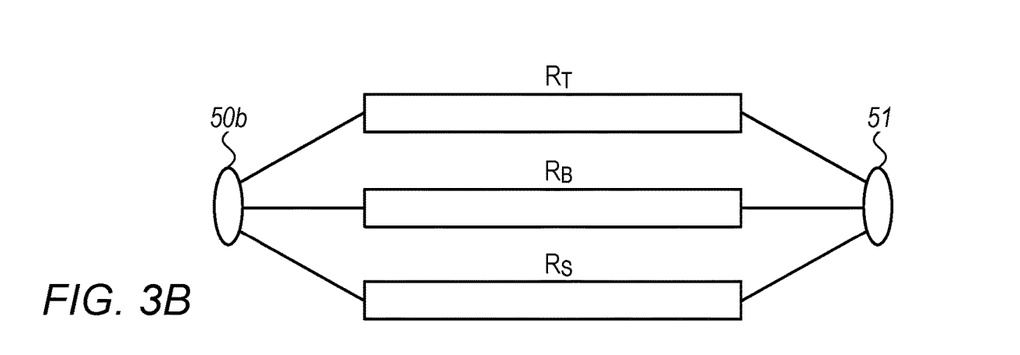

FIGS. 3A and 3B are schematic electrical diagrams of a functional electrode 50 electrically coupled to an interior electrode 51 while the functional electrode is in blood pool 55 and is in contact with wall tissue 53, respectively, in accordance with an embodiment of the present invention. The diagram of FIG. 3A describes a case of functional electrode 50*a* immersed deep in blood pool 55. As seen, the impedance (e.g., impedance 252) between functional electrode 50*a* and center electrode 51 equals that of blood, $R_B$, in parallel to a shunt resistance $R_S$ that might result from blood and/or tissue and/or other electrically conductive intra-body channel. In brief notation this is represented as $|Z\_252|=R_B \| R_S$.

The diagram of FIG. 3B describes the case of functional electrode 50*b* completely in contact with wall tissue 53 of FIG. 2. As seen, the impedance between ablation electrode 50*b* and center electrode 51 is of blood in parallel with tissue, $R_B \| R_T$, in parallel to the shunt resistance $R_S$. In brief notation this is represented as $|Z\_256|=R_B \| R_T \| R_S$. As $R_B \| R_T < R_B$, e.g., by at least few tens of ohms, an amount called hereinafter "impedance threshold", the disclosed method can differentiate between the two cases. Moreover, an in-between value, $Z\_254$, $Z\_256 < Z\_254 < Z\_252$ can be measured, and using calibrated graph 250 of FIG. 2, a processor may estimate from $Z\_254$ the proximity of electrode 50 to tissue.

The electrical diagrams shown in FIGS. 3A and 3B are highly simplified, with the aim of presenting the concept. Actual values may be determined empirically or by a more elaborate electrical model. FIGS. 3A and 3B are fully applicable to any electrode, like center electrode 51, that is away from tissue, such as to a proximal electrode disposed on a shaft just proximally to a balloon, a multi-arm, or a lasso catheter, each mounted with multiple tissue sensing/ablation electrodes of similar functionality to that of functional electrodes 50.

Figure 4:
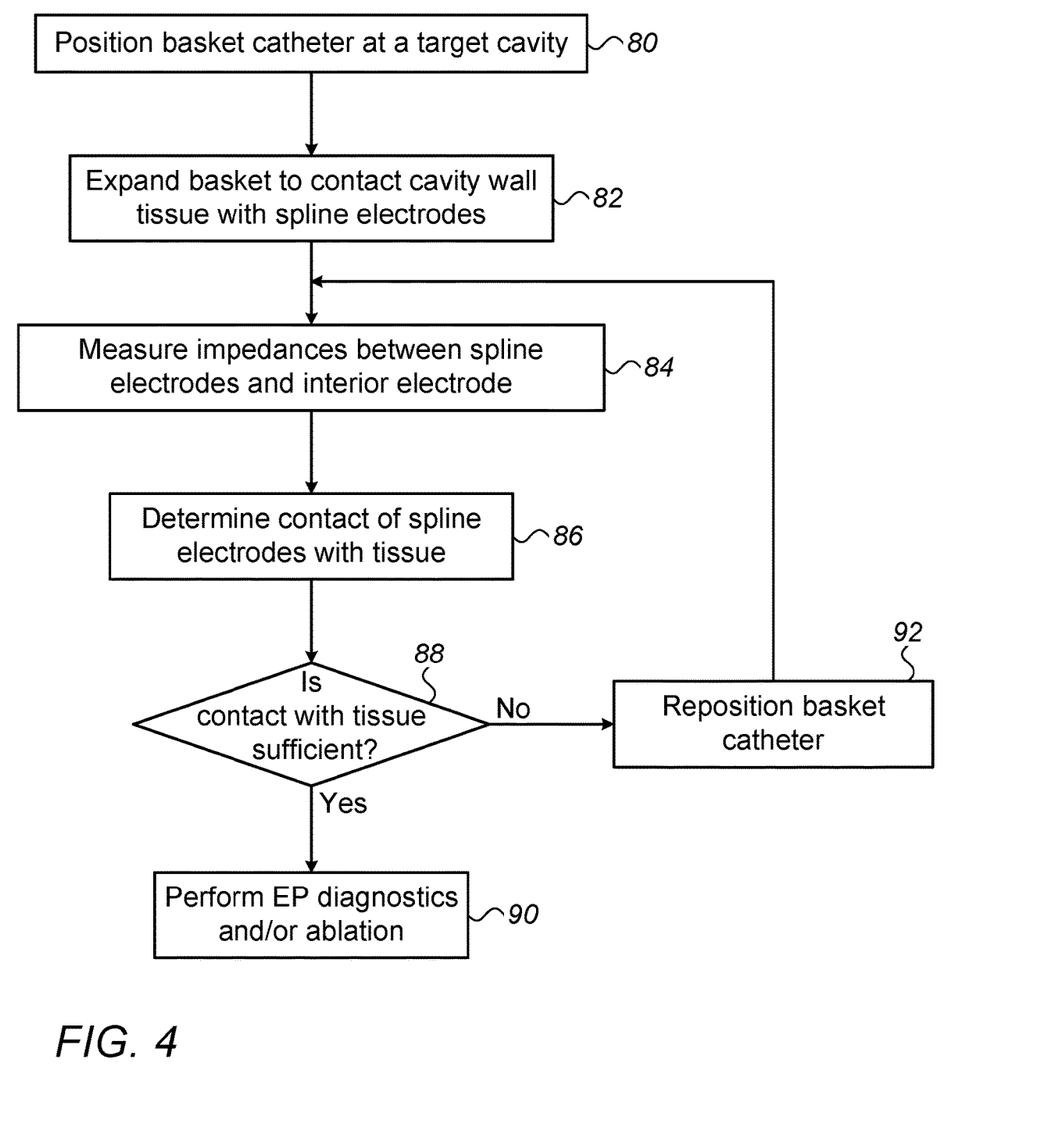
FIG. 4 is a flow chart that schematically illustrates a method and algorithm for determining functional electrode contact with wall tissue using the interior electrode of FIG. 2, in accordance with an embodiment of the present invention.

FIG. 4 is a flow chart that schematically illustrates a method and algorithm for determining contact of functional electrode 50 with wall tissue 53, in accordance with an embodiment of the present invention. The algorithm according to the present embodiment carries out a process that begins with physician 30 positioning a partially expanded basket catheter 40 at a target location inside a cardiac cavity of heart 26, such as at an ostium of a pulmonary vein, at a basket positioning step 80. Next, physician 30 expands the basket to bring at least a portion (e.g., sub-set) of functional electrodes 50 into full contact with tissue, e.g., over an entire lateral circumference of assembly 43, in a basket expansion step 82. Next, at impedances measurement step 84, system 20 measures impedances between each of functional electrodes 50 and the center (i.e., interior) electrode 51.

At a physical contact determination step 86, based on the measured impedances, processor 41 determines, for each functional electrode 50, whether the electrode is in contact with tissue, as defined above, or at least in sufficient proximity. If, at a contact checking step 88, the processor determines that all functional electrodes 50 are in contact with tissue, the process continues to perform diagnostics and/or ablation, at diagnostics and/or ablation step 90. If, on the other hand, one or more electrodes are determined by processor 41 to be immersed in a blood pool (e.g., blood pool 55 of FIG. 1) and therefore too far away from tissue, physician 30 then repositions basket catheter 40 in an attempt to improve contact, and the process loops back to step 84, to reassess sufficiency of contact.

The example flow chart shown in FIG. 4 is chosen purely for the sake of conceptual clarity. The present embodiment also comprises additional steps of the algorithm, such as acquiring intra-cardiac electrocardiograms, which have been omitted from the disclosure herein purposely in order to provide a more simplified flow chart. In addition, other steps, such as temperature measurements and applying irrigation, are omitted for clarity of presentation.

Although the embodiments described herein mainly address cardiac applications, the methods and systems described herein can also be used in other applications, such as in renal denervation.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A system, comprising:
    a catheter comprising a distal-end assembly coupled to a distal end of a shaft for insertion into a cavity of an organ of a patient, the distal-end assembly comprising (i) a plurality of functional electrodes positioned at one or more corresponding distances from a longitudinal axis of the distal-end assembly and configured to be placed in contact with wall tissue of the cavity and (ii) a reference electrode positioned on an interior portion of the distal-end assembly located along the longitudinal axis and configured to be placed in the cavity but not in contact with the wall tissue of the cavity; and a processor, which is configured to:
estimate a first impedance value of a plurality of impedance values between a first functional electrode of the plurality of functional electrodes and the reference electrode, the first functional electrode being submerged in blood;
estimate a second impedance value of the plurality of impedance values between a second functional electrode of the plurality functional electrodes and the reference electrode, the second functional electrode being in contact with the wall tissue of the cavity;
estimate a third impedance value of the plurality of impedance values between a third functional electrode of the plurality of functional electrodes and the reference electrode, the third functional electrode selected from remaining functional electrodes of the plurality of functional electrodes in various levels of proximity to the wall tissue of the cavity;
generate a graph, based at least in part on the first impedance value and the second impedance value, that illustrates a relationship between the third impedance value and a distance between the third functional electrode and the wall tissue of the cavity; and
based on the generated graph, determine, for at least the third functional electrode, whether the third functional electrode is in physical contact with the wall tissue of the cavity.

2. The system according to claim 1, further comprising a relay assembly that is configured to switch, under control of the processor, between (i) a first configuration for measuring impedances between the plurality of functional electrodes and the reference electrode, and (ii) a second configuration for performing a medical procedure using the plurality of functional electrodes.

3. The system according to claim 1, wherein the processor is configured to determine that at least one of the plurality of functional electrodes is in physical contact with the wall tissue by determining that a measured impedance is lower than a prespecified impedance threshold.

4. The system according to claim 3, wherein the prespecified impedance threshold is measured while the reference electrode is in contact with blood in the cavity.

5. The system according to claim 1, wherein the distal-end assembly comprises an expandable frame comprising multiple splines, wherein each spline of the multiple splines comprises at least one functional electrode of the plurality of functional electrodes.

6. The system according to claim 5, wherein each spline of the multiple splines converges distally toward a distal-most point of the expandable frame.

7. The system according to claim 1, the distal-end assembly further comprising a center member extending along the longitudinal axis of the catheter, the reference electrode being disposed along the center member.

8. The system according to claim 7, the center member further comprising a contraction wire connected to the distal end of the distal-end assembly, the contraction wire configured to cause an expandable frame of the distal-end assembly to expand or contract when pulled.

9. A method, comprising:
inserting into a cavity of an organ of a patient a catheter comprising a distal-end assembly coupled to a distal end of a shaft, the distal-end assembly comprising (i) a plurality of functional electrodes positioned one or more corresponding distances from a longitudinal axis of the distal-end assembly and configured to be placed in contact with wall tissue of the cavity and (ii) a reference electrode positioned on an interior portion of the distal-end assembly located along the longitudinal axis and configured to be placed in the cavity but not in contact with the wall tissue of the cavity;
estimating a first impedance value of a plurality of impedance values between a first functional electrode of the plurality of functional electrodes and the reference electrode, the first functional electrode being submerged in blood;
estimating a second impedance value of the plurality of impedance values between a second functional electrode of the plurality functional electrodes and the reference electrode, the second functional electrode being in contact with the wall tissue of the cavity;
estimating a third impedance value of the plurality of impedance values between a third functional electrode and the reference electrode, the third functional electrode selected from remaining functional electrodes of the plurality of functional electrodes in various levels of proximity to the wall tissue of the cavity;
generating a graph, based at least in part on the first impedance value and the second impedance value, that illustrates a relationship between the third impedance value and a distance between the third functional electrode and the wall tissue of the cavity; and
based at least in part on the generated graph, determining, for at least the third functional electrode, whether the third functional electrode is in physical contact with the wall tissue of the cavity.

10. The method according to claim 9, wherein the distal end assembly comprises an expandable frame comprising multiple splines, wherein each spline of the multiple splines comprises at least one functional electrode of the plurality of functional electrodes.

11. The method according to claim 9, further comprising switching between (i) a first configuration for measuring impedances between the plurality of functional electrodes and the reference electrode, and (ii) a second configuration for performing a medical procedure using the plurality of functional electrodes.

12. The method according to claim 9, wherein determining that at least one of the plurality of functional electrodes is in physical contact with the wall tissue comprises determining that a measured impedance is lower than a prespecified impedance threshold.

13. The method according to claim 12, wherein the prespecified impedance threshold is measured while the reference electrode is in contact with blood in the cavity.

* * * * *